United States Patent
Lin et al.

(10) Patent No.: US 10,253,904 B1
(45) Date of Patent: Apr. 9, 2019

(54) INTEGRATED IMMERSED TUBE COUPLING AND INSTALLATION METHOD THEREOF AS WELL AS INSTALLATION CLOSURE METHOD OF IMMERSED TUBE COUPLING

(71) Applicant: CCCC Highway Consultants Co., Ltd., Beijing (CN)

(72) Inventors: Wei Lin, Beijing (CN); Ming Lin, Beijing (CN); Xiaodong Liu, Beijing (CN); Yi Li, Beijing (CN)

(73) Assignee: CCCC Highway Consultants Co., Ltd., Beijing (CN)

( * ) Notice: Subject to any disclaimer, the term of this patent is extended or adjusted under 35 U.S.C. 154(b) by 0 days.

(21) Appl. No.: 15/870,640

(22) Filed: Jan. 12, 2018

(30) Foreign Application Priority Data

Nov. 3, 2017 (CN) .......................... 2017 1 1071280

(51) Int. Cl.
*E02D 29/073* (2006.01)
*F16L 1/16* (2006.01)
(Continued)

(52) U.S. Cl.
CPC .............. *F16L 1/16* (2013.01); *E02D 29/073* (2013.01); *F16L 1/207* (2013.01); *F16L 1/26* (2013.01); *B21D 39/046* (2013.01)

(58) Field of Classification Search
CPC .... E02D 29/063; E02D 29/067; E02D 29/073
(Continued)

(56) References Cited

U.S. PATENT DOCUMENTS 2,946,197 A * 7/1960 Lassen-Nielsen .... E02D 29/073
                                                            285/191
3,901,038 A * 8/1975 Olsen .................... E02D 29/073
                                                            285/18
(Continued)

FOREIGN PATENT DOCUMENTS

GB      2019926 A * 11/1979 .......... E02D 29/067
JP     02035193 A *  2/1990 .......... E02D 29/063
(Continued)

*Primary Examiner* — Frederick L Lagman
(74) *Attorney, Agent, or Firm* — Andrew D. Fortney; Central California IP Group, P.C.

(57) ABSTRACT

The present application discloses an integrated immersed tube section and an installation method thereof, and an installation and closure method of immersed tube sections, wherein the integrated immersed tube section includes a standard immersed tube section; and closed annular telescopic water stop joints are arranged at two ends of the standard immersed tube section. By the adoption of the integrated immersed tube section of the present application, a finally closed immersed tube section is still the standard immersed tube section, and a foundation which is the same as that for common tube sections is used, namely the foundation for the finally closed immersed tube section and the foundation for other immersed tube sections do not have a rigidity difference, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the methods have the advantages of eliminating installation of one special final joint, simplifying the construction process and reducing the engineering risk. As offshore special construction equipment and ships are very expensive in rent, use of (Continued)

the integrated immersed tube section substantially reduces the cost and saves various resources.

27 Claims, 8 Drawing Sheets

(51) Int. Cl.
 *F16L 1/20* (2006.01)
 *F16L 1/26* (2006.01)
 *B21D 39/04* (2006.01)
(58) Field of Classification Search
 USPC .......................................................... 405/136
 See application file for complete search history.

(56) References Cited

U.S. PATENT DOCUMENTS

| | | | | |
|---|---|---|---|---|
| 3,910,058 A | * | 10/1975 | Fouillade | E02D 25/00 405/136 |
| 4,095,435 A | * | 6/1978 | Uemura | E21D 9/005 405/135 |
| 4,444,526 A | * | 4/1984 | Foundoukos | E02D 29/063 405/132 |
| 4,462,535 A | * | 7/1984 | Johnston | E02D 29/063 228/151 |
| 4,889,448 A | * | 12/1989 | Bell | E02D 29/07 405/135 |
| 5,540,522 A | * | 7/1996 | Launaro | E02D 29/067 405/132 |
| 5,899,635 A | * | 5/1999 | Kuja | E02D 29/067 405/134 |
| 8,496,406 B2 | * | 7/2013 | Hertgers | E02D 29/073 405/136 |

FOREIGN PATENT DOCUMENTS

| | | | | |
|---|---|---|---|---|
| JP | 04083094 A | * | 3/1992 | |
| JP | 2003-74077 | * | 3/2003 | |
| WO | WO-9015223 A1 | * | 12/1990 | ........... E02D 29/067 |

* cited by examiner

US 10,253,904 B1

INTEGRATED IMMERSED TUBE COUPLING AND INSTALLATION METHOD THEREOF AS WELL AS INSTALLATION CLOSURE METHOD OF IMMERSED TUBE COUPLING

This application claims the benefit of Chinese Patent Application No. 2017110712805, filed Nov. 3, 2017, incorporated herein by reference in its entirety.

TECHNICAL FIELD

The present application relates to the field of construction of subsea tunnels, and more particularly relates to an integrated immersed tube section and an installation method thereof, and an installation and closure method of immersed tube sections.

BACKGROUND ART

Immersed tube method-based tunnel construction is to respectively transport tunnel immersed tubes, which are prefabricated in a semi-submerged barge or a dry dock, in a floating manner to preset positions for immersion and jointing. In order to successfully immerse the last tube section, a distance space longer than the tube section must be reserved, and the tube section immersed and jointed in the reserved distance space is regarded as a final joint, namely two ends connected with a tunnel are immersed and are jointed and closed in the sea, and a finally closed tube section is the final joint. The existing final joints are all integrated active water stop final joints, and have lengths conforming to a distance (which is generally within 30 meters in length) between two sections of immersed tunnels. All the final joints are independently designed, and are different from common tube sections (which have lengths more than 100 meters); and respective foundations for immersing and supporting the final joints and foundations for the common tube sections have a rigidity difference, which may cause non-uniform settlement of the final joints and the common tube sections during operation of a subsea tunnel, and cause a damage to the subsea tunnel.

SUMMARY OF THE INVENTION

For the purpose of overcoming the above shortcomings that existing final joints are all independently designed, and are different from common tube sections, and foundations for immersing and supporting the final joints and foundations for the common tube sections have a rigidity difference, which may cause non-uniform settlement of the final joints and the common tube sections during operation of a subsea tunnel, and cause a damage to the subsea tunnel, the present application provides an integrated immersed tube section and an installation method thereof, and an installation and closure method of immersed tube sections.

In order to achieve the purpose of the present application, the present application provides the following schemes:

An integrated immersed tube section is provided, including a standard immersed tube section, and closed annular telescopic water stop joints are arranged at two ends of the standard immersed tube section.

It should be noted here that the standard immersed tube section means that the length of an immersed tube section, which serves as a final joint in a subsea immersed tube, is equal to that of each of other common immersed tube sections.

End seal doors are respectively arranged at two ends of each immersed tube section to prevent seawater from entering the immersed tube section. After the immersed tube section is jointed with an installed immersed tube section, a jointing cavity is formed between two oppositely arranged end seal doors of two adjacent immersed tube sections; after water in the jointing cavity is drained off, the end seal doors are removed so as to communicate the two adjacent immersed tube sections; and here, the immersed tube sections include the pre-laid and installed standard immersed tube section and the finally closed integrated immersed tube section.

By the adoption of the integrated immersed tube section of the present application, the finally closed immersed tube section is still the standard immersed tube section, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Preferably, the standard immersed tube section is of a concrete sectional structure, a concrete integrated structure, a steel shell integrated structure or a sandwich steel shell integrated structure.

Preferably, the end portions of two ends of the standard immersed tube section are of steel shell, steel cap or sandwich structures.

Preferably, the cross section of the standard immersed tube section adopts two holes and one pipe gallery, two holes and two pipe galleries, three holes and one pipe gallery, or three holes and two pipe galleries and the like.

Preferably, the telescopic water stop joints include closed annular frame beams, power components, closed annular first water stop components and closed annular second water stop components; one end of each power component is connected to each end portion of the standard immersed tube section, and the other end of the power component is connected to each frame beam and may drive the frame beam to extend and retract along the axial direction of the standard immersed tube section; the first water stop components are connected to the end portions of the frame beams; and one end of each second water stop component is connected to each frame beam, and the other end of the second water stop component is connected to each end portion of the standard immersed tube section.

After the integrated immersed tube section is mounted in place, the power components arranged at the two ends of the integrated immersed tube section jack and push the corresponding frame beams to move; each frame beam moves to drive each corresponding first water stop component to be closely fitted to the end surface of each corresponding immersed tube section, so that the integrated immersed tube section is jointed with the two adjacent immersed tube sections to isolate seawater inside and outside the tube sections to complete water stopping; the second water stop components are of extensible flexible structures, and may extend along with movements of the corresponding frame beams; and the second water stop components prevent the seawater from entering the integrated immersed tube section from gaps between the frame beams and the end portions of the standard immersed tube section.

Preferably, the first water stop components are Gina water stop bands.

Preferably, the second water stop components are M water stop bands.

Preferably, annular grooves are formed in the end portions of the standard immersed tube section; the frame beams are matched with the grooves; and the telescopic water stop joints may slide in the grooves.

Preferably, the power components are arranged in the grooves.

Preferably, the telescopic water stop joints further include counter force components; the frame beams are connected with the counter force components; the counter force components are connected with the power components; and the power components are connected to the end portions of the standard immersed tube section.

Preferably, the counter force components include a plurality of counter force frames.

Preferably, the end seal doors are arranged at the end portions of the standard immersed tube section; the frame beams are connected with the counter force components; the counter force components are connected with the power components; and the power components are connected to the end seal doors.

Preferably, the power components include a plurality of hydraulic jacks.

Preferably, all the hydraulic jacks are uniformly distributed at the end portions of the standard immersed tube section.

Preferably, the inner sides of annular cavities of the frame beams are connected with supporting components.

By adoption of such structural arrangement, the supporting components enable the frame beams to keep certain rigidity and move steadily; in addition, during subsequent water drainage from the jointing cavities, an internal pressure of the frame beams is less than an external pressure of the frame beams; the supporting components effectively support the frame beams to prevent the frame beams from losing part of original functions due to their deformations caused by an environmental pressure change, thus achieving aims of design and use.

Preferably, the supporting components include a plurality of transverse supporting steel pipes and a plurality of longitudinal supporting steel pipes; all the transverse supporting steel pipes and all the longitudinal supporting steel pipes are arranged in a staggering manner; and each transverse supporting steel pipe and each longitudinal supporting steel pipe are rigidly connected.

Preferably, the standard immersed tube section includes at least one flexible joint which enables the standard immersed tube section to keep rigidity and also have flexibility, thus facilitating releasing of internal stress of the standard immersed tube section.

Preferably, two flexible joints are arranged at positions, which are close to the two ends, on the standard immersed tube section, and divide the standard immersed tube section into three tube section segments.

Preferably, each flexible joint includes a circle of closed annular first water stop band; and the first water stop bands are pre-compressed by prestress components, and are closely fitted to the end surfaces of two adjacent tube section segments.

Preferably, the first water stop bands are Gina water stop bands.

Preferably, each flexible joint also includes a plurality of jacking components; the length of each jacking component is adjustable; the jacking components are arranged on the annular inner sides of the first water stop bands in a spacing manner; each jacking component jacks two tube section segments along its adjustment direction; and all the jacking components are used to prevent further pressing damage to the first water stop bands under the action of water pressure.

Preferably, each flexible joint further includes a circle of closed annular second water stop band which is located on the annular inner side of each first water stop band, and is used for secondary waterproofing.

Preferably, the second water stop bands are Ω water stop bands; one hem of each Ω water stop band is connected to the end portion of one tube section segment, and the other hem of the Ω water stop band is connected to the end portion of the adjacent tube section segment; and the Ω water stop bands protrude towards the inside of the standard immersed tube section.

Preferably, an included angle between the top surface of the standard immersed tube section and each end surface of the standard immersed tube section is 60 to 90 degrees.

Preferably, an included angle between the top surface of the standard immersed tube section and each end surface of the standard immersed tube section is 80 to 90 degrees.

Preferably, the included angles between the top surface of the standard immersed tube section and the end surfaces of the standard immersed tube section are equal.

Preferably, a plurality of anti-collision blocks are arranged on two end surfaces of the standard immersed tube section to prevent a structural damage or a function failure of the telescopic water stop joints due to a displacement or a structural damage of the integrated immersed tube section and/or two immersed tube sections, which is caused by collision between the standard immersed tube section and the two immersed tube sections during matching between the integrated immersed tube section and the two immersed tube sections.

The present application further provides an installation method of an integrated immersed tube section, including:

A. hoisting the integrated immersed tube section to an immersion position in a floating manner, wherein the integrated immersed tube section includes a standard immersed tube section, and closed annular telescopic water stop joints are arranged at two ends of the standard immersed tube section;

B. immersing the integrated immersed tube section, and adjusting the position of the integrated immersed tube section to place the integrated immersed tube section between two installed immersed tube sections;

C. respectively moving the two telescopic water stop joints to jack the end surfaces of the corresponding immersed tube sections to form two jointing cavities for isolating seawater inside and outside the tube sections, thus completing water stopping;

D. draining water from the two jointing cavities;

E. arranging a rigid joint on the inner side of each telescopic water stop joint to connect the integrated immersed tube section with two adjacent immersed tube sections, and grouting the rigid joints to complete installation of the integrated immersed tube section.

End seal doors are arranged at two ends of each immersed tube section to prevent seawater from entering the immersed tube section. After the immersed tube section is jointed with an installed immersed tube section, a jointing cavity is formed between two oppositely arranged end seal doors of the two adjacent immersed tube sections; after water in the jointing cavity is drained off, the end seal doors are removed so as to communicate the two adjacent immersed tube sections; and here, the immersed tube sections include the pre-laid and installed standard immersed tube section and the finally closed integrated immersed tube section.

By the adoption of the installation method of the integrated immersed tube section of the present application, the finally closed immersed tube section is still the standard immersed tube section, and a foundation which is the same as that for common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with the existing method, the installation method has the advantages of eliminating installation of one special final joint, simplifying the construction process and reducing the engineering risk. As the offshore special construction equipment and ships are very expensive in rent, use of the installation method of the integrated immersed tube section substantially reduces the cost and saves various resources. The method has a clear theory and simple steps, and may accurately and successfully install the integrated immersed tube section between two immersed tube sections, thus realizing successful jointing and opening of the integrated immersed tube section and the two immersed tube sections.

Preferably, before the step A, a foundation bed for the integrated immersed tube section is laid on the seabed, and is consistent with foundation beds for other immersed tube sections.

Preferably, during implementation of the step A, the position of the integrated immersed tube section on a horizontal plane is adjusted once when the integrated immersed tube section settles 8 to 12 m at each time so as to match positions between the integrated immersed tube section and the two immersed tube sections.

Preferably, after the step C, a diver confirms that no included foreign matters exist between each telescopic water stop joint and the end portion of each corresponding immersed tube section, and then the step D is carried out.

Preferably, during implementation of the step D, pressures in the jointing cavities are adjusted when the water is drained, so that the pressures in the jointing cavities can be steadily reduced from a seabed water pressure to the atmospheric pressure.

Preferably, the step D includes:

D1. pressure adjustment for water drainage: draining water which is ⅕ to ½ of the total water amount in the jointing cavities under a differential pressure so as to enable pressure values in the jointing cavities to be gradually reduced to the atmospheric pressure, and enable the jointing cavities to be opened to the atmosphere;

D2. water drainage with a ballast pump: pumping out residual water in the jointing cavities with the ballast pump.

Preferably, after the step D2 is completed, it confirms that the watertightness conditions of the jointing cavities meet the design requirements, and the residual water in the jointing cavities is drained with a stripping pump.

Preferably, air compressors are arranged in the immersed tube sections, and are used to input air into the jointing cavities in the step D1 so as to adjust the pressure.

Preferably, first pressure gauges are arranged on the end seal doors, and are used to monitor real-time pressures in the jointing cavities.

Preferably, second pressure gauges are arranged on the air compressors, and before the step D1, initial pressures of both the first pressure gauges and the second pressure gauges are calibrated.

Preferably, after the step E is completed, exposed portions of the two adjacent immersed tube sections and the integrated immersed tube section are backfilled.

Preferably, the backfilling includes covering backfilling and ballast backfilling. The exposed portions of the two adjacent immersed tube sections and the integrated immersed tube section are firstly subjected to the covering backfilling, and are then subjected to the ballast backfilling.

Preferably, after the step D, the integrated immersed tube section and the end seal doors in the two immersed tube sections closed with the integrated immersed tube section are removed so as to open a subsea tunnel.

The present application further provides an installation and closure method of immersed tube sections, including:

a. installing two standard immersed tube sections on two sides of a finally closed section, and respectively arranging closed annular telescopic water stop joints at two opposite end portions of the two standard immersed tube sections;

b. hoisting the standard immersed tube sections of the finally closed section to immersion positions in a floating manner;

c. immersing and adjusting the standard immersed tube sections of the finally closed section to place the standard immersed tube sections of the finally closed section between two installed standard immersed tube sections;

d. respectively moving the two telescopic water stop joints located on two sides of each standard immersed tube section of the finally closed section to jack the two end surfaces of each standard immersed tube section of the finally closed section to form two jointing cavities for isolating seawater inside and outside the tube sections, thus completing water stopping;

e. draining water from the two jointing cavities;

f. arranging a rigid joint on the inner side of each telescopic water stop joint to connect the standard immersed tube sections of the finally closed section with two adjacent standard immersed tube sections, and grouting the rigid joints to complete installation and closure of the immersed tube sections.

By the adoption of the installation and closure method of the immersed tube sections of the present application, the finally closed immersed tube sections are still the standard immersed tube sections, and a foundation which is the same as that for common tube sections is used, namely there is no rigidity difference between the foundation for the finally closed immersed tube sections and the foundation for other immersed tube sections, so that the risk of the non-uniform settlement of the tube sections during operation of the subsea tunnel is effectively reduced; and in addition, the finally closed immersed tube sections and other immersed tube sections are installed with the same installation equipment, and no extra equipment such as a floating crane is needed. Compared with the existing method, the installation and closure method has the advantages of eliminating installation of one special final joint, simplifying the construction process and reducing the engineering risk. As the offshore special construction equipment and ships are very expensive in rent, use of the installation and closure method of the immersed tube sections substantially reduces the cost and saves various resources. The method has a clear theory and simple steps, and may accurately and successfully install the standard immersed tube sections between two standard immersed tube sections, thus realizing successful jointing and opening of the subsea tunnel.

In conclusion, by adoption of the above-mentioned technical schemes, the present application has the beneficial effects as follows:

1. By the adoption of the integrated immersed tube section of the present application, the finally closed immersed tube section is still the standard immersed tube section, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

2. By the adoption of the integrated immersed tube section of the present application, the inner sides of annular cavities of the frame beams are connected with supporting components; by adoption of such structural arrangement, the supporting components enable the frame beams to keep certain rigidity and move steadily; in addition, during subsequent water drainage from the jointing cavities, an internal pressure of the frame beams is less than an external pressure of the frame beams; the supporting components effectively support the frame beams to prevent the frame beams from losing part of original functions due to their deformations caused by an environmental pressure change, thus achieving aims of design and use.

3. By the adoption of the installation method of the integrated immersed tube section of the present application, the finally closed immersed tube section is still the standard immersed tube section, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with the existing method, the installation method has the advantages of eliminating installation of one special final joint, simplifying the construction process and reducing the engineering risk. As the offshore special construction equipment and ships are very expensive in rent, use of the installation method of the integrated immersed tube section substantially reduces the cost and saves various resources. The method has a clear theory and simple steps, and may accurately and successfully install the integrated immersed tube section between two immersed tube sections, thus realizing successful jointing and opening of the integrated immersed tube section and the two immersed tube sections.

4. By the adoption of the installation and closure method of the immersed tube sections of the present application, the finally closed immersed tube sections are still the standard immersed tube sections, and a foundation which is the same as that for the common tube sections is used, namely there is no rigidity difference between the foundation for the finally closed immersed tube sections and the foundation for other immersed tube sections, so that the risk of the non-uniform settlement of the tube sections during operation of the subsea tunnel is effectively reduced; and in addition, the finally closed immersed tube sections and other immersed tube sections are installed with the same installation equipment, and no extra equipment such as a floating crane is needed. Compared with the existing method, the installation and closure method has the advantages of eliminating installation of one special final joint, simplifying the construction process and reducing the engineering risk. As the offshore special construction equipment and ships are very expensive in rent, use of the installation and closure method of the immersed tube sections substantially reduces the cost and saves various resources. The method has a clear theory and simple steps, and may accurately and successfully install the standard immersed tube sections between two standard immersed tube sections, thus realizing successful jointing and opening of the subsea tunnel.

Figure 1:
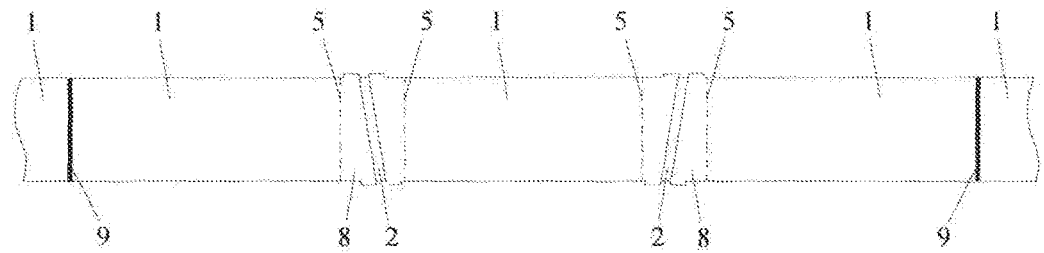
FIG. 1 is a schematic diagram of a structure of an integrated immersed tube section of the present application.

Markers in the drawings: 1 for standard immersed tube section, 11 for groove, 2 for telescopic water stop joint, 21 for frame beam, 22 for power component, 23 for counter force component, 3 for first water stop component, 4 for second water stop component, 5 for end seal door, 6 for supporting component, 7 for flexible joint, 8 for jointing cavity, and 9 for immersing and jointing joint.

DETAILED DESCRIPTION OF THE INVENTION

A further detailed description will be made to the present application in combination with test cases and specific implementation modes as follows, but it should not be understood that the scope of the theme of the present application is only limited to the following embodiments. Technologies implemented on the basis of contents of the present application shall all fall within the scope of the present application.

Embodiment 1

As shown in FIG. 1 and FIGS. 4 to 6, an integrated immersed tube section of the present application includes a standard immersed tube section 1, and closed annular telescopic water stop joints 2 are arranged at two ends of the standard immersed tube section 1.

Figure 2:
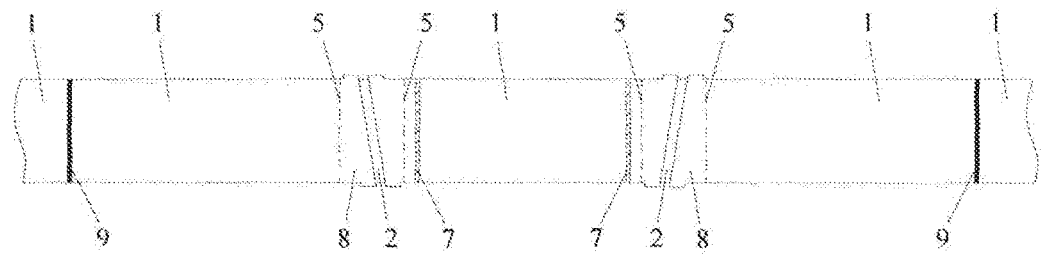
FIG. 2 is a schematic diagram of another structure of an integrated immersed tube section of the present application.
Figure 3:
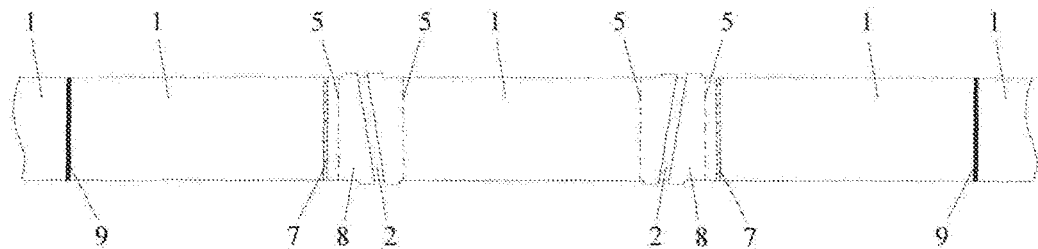
FIG. 3 is a schematic diagram of another structure of an integrated immersed tube section of the present application.
Figure 4:
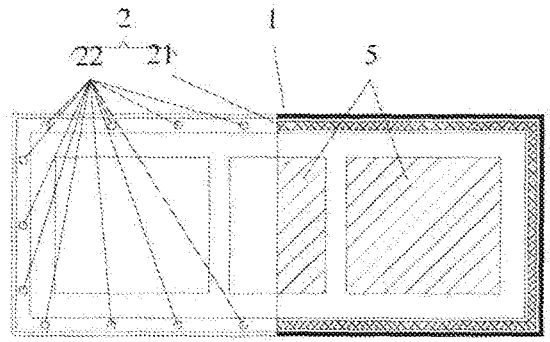
FIG. 4 is a schematic diagram of an end portion structure of an integrated immersed tube section of the present application.
Figure 5:
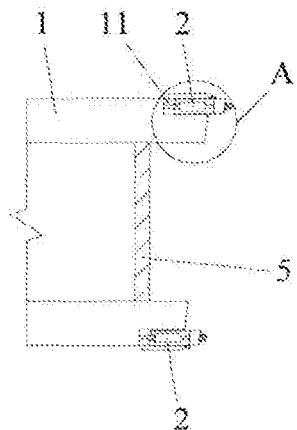
FIG. 5 is a left view of FIG. 4.
Figure 6:
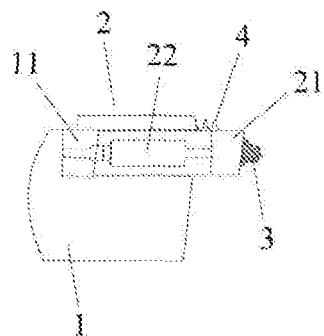
FIG. 6 is an enlarged view of A in FIG. 5.
Figure 7:
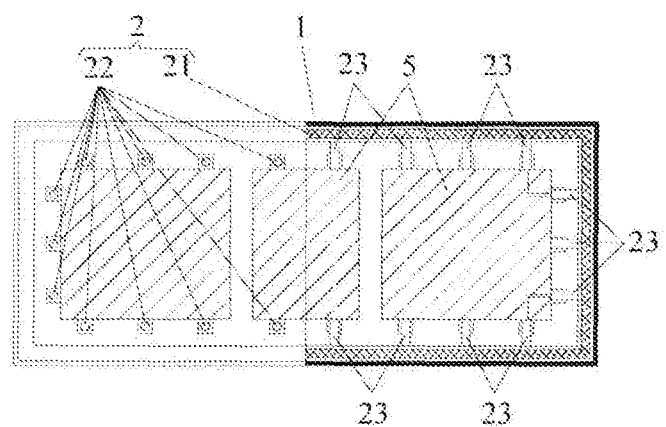
FIG. 7 is a schematic diagram of another end portion structure of an integrated immersed tube section of the present application.
Figure 8:
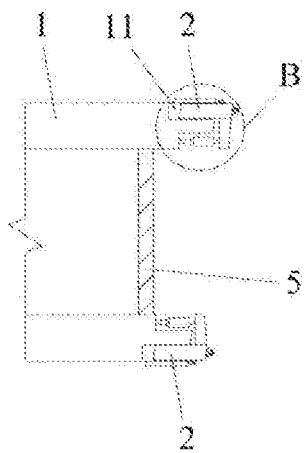
FIG. 8 is a left view of FIG. 7.
Figure 9:
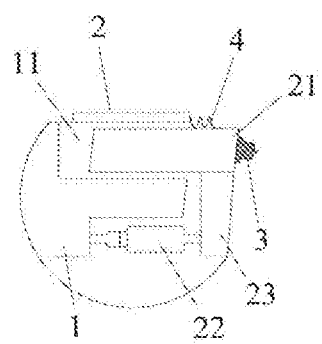
FIG. 9 is an enlarged view of B in FIG. 8.
Figure 10:
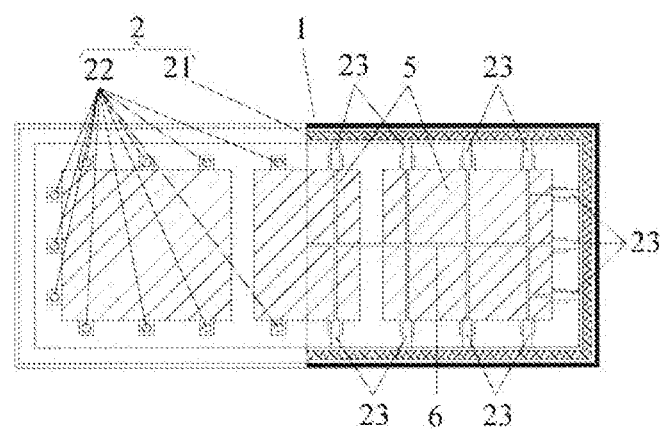
FIG. 10 is a schematic diagram of another end portion structure of an integrated immersed tube section of the present application.
Figure 11:
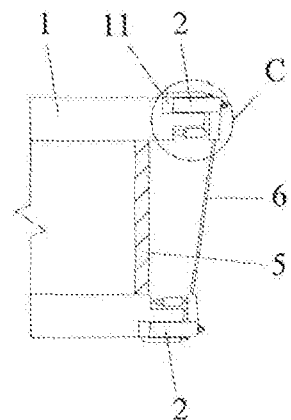
FIG. 11 is a left view of FIG. 10.
Figure 12:
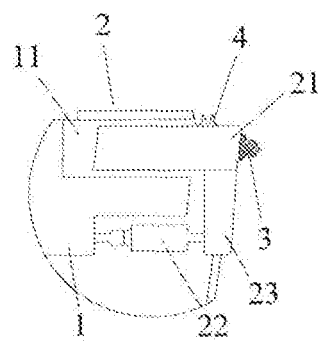
FIG. 12 is an enlarged view of C in FIG. 11.
Figure 13:
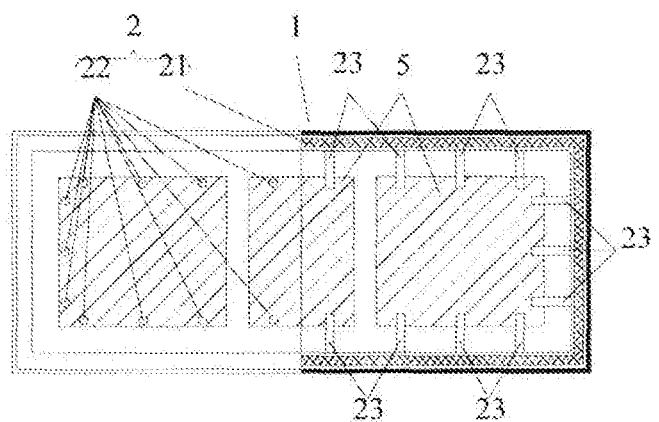
FIG. 13 is a schematic diagram of another end portion structure of an integrated immersed tube section of the present application.
Figure 14:
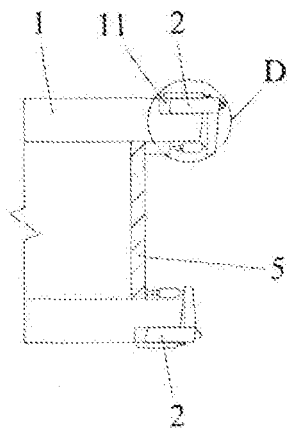
FIG. 14 is a left view of FIG. 13.
Figure 15:
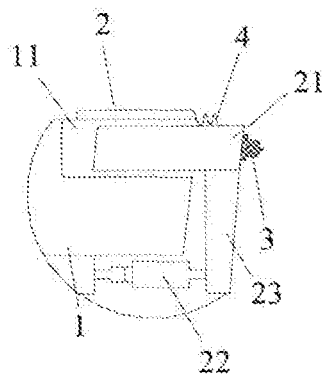
FIG. 15 is an enlarged view of D in FIG. 14.
Figure 16:
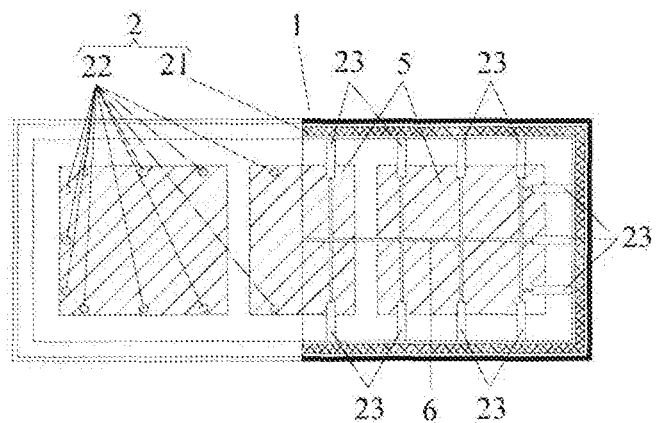
FIG. 16 is a schematic diagram of another end portion structure of an integrated immersed tube section of the present application.
Figure 17:
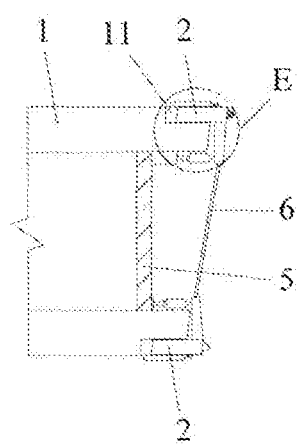
FIG. 17 is a left view of FIG. 16.
Figure 18:
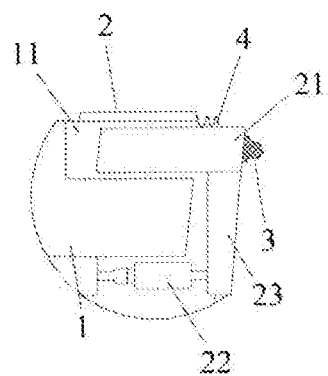
FIG. 18 is an enlarged view of E in FIG. 17.
Figure 19:
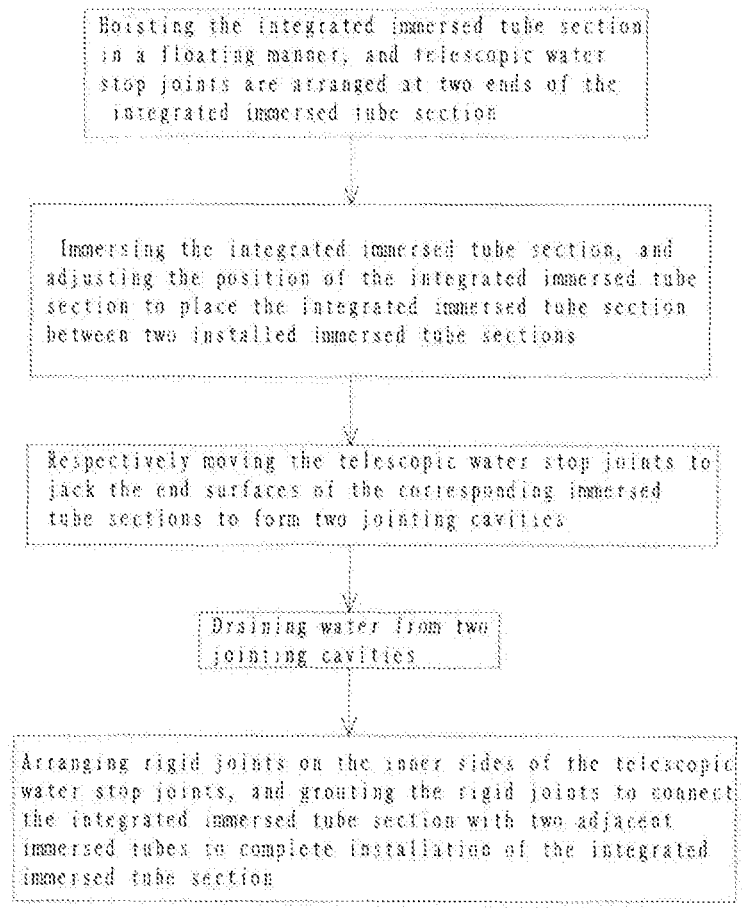
FIG. 19 is a flow diagram of an installation method of an integrated immersed tube section of the present application.
Figure 20:
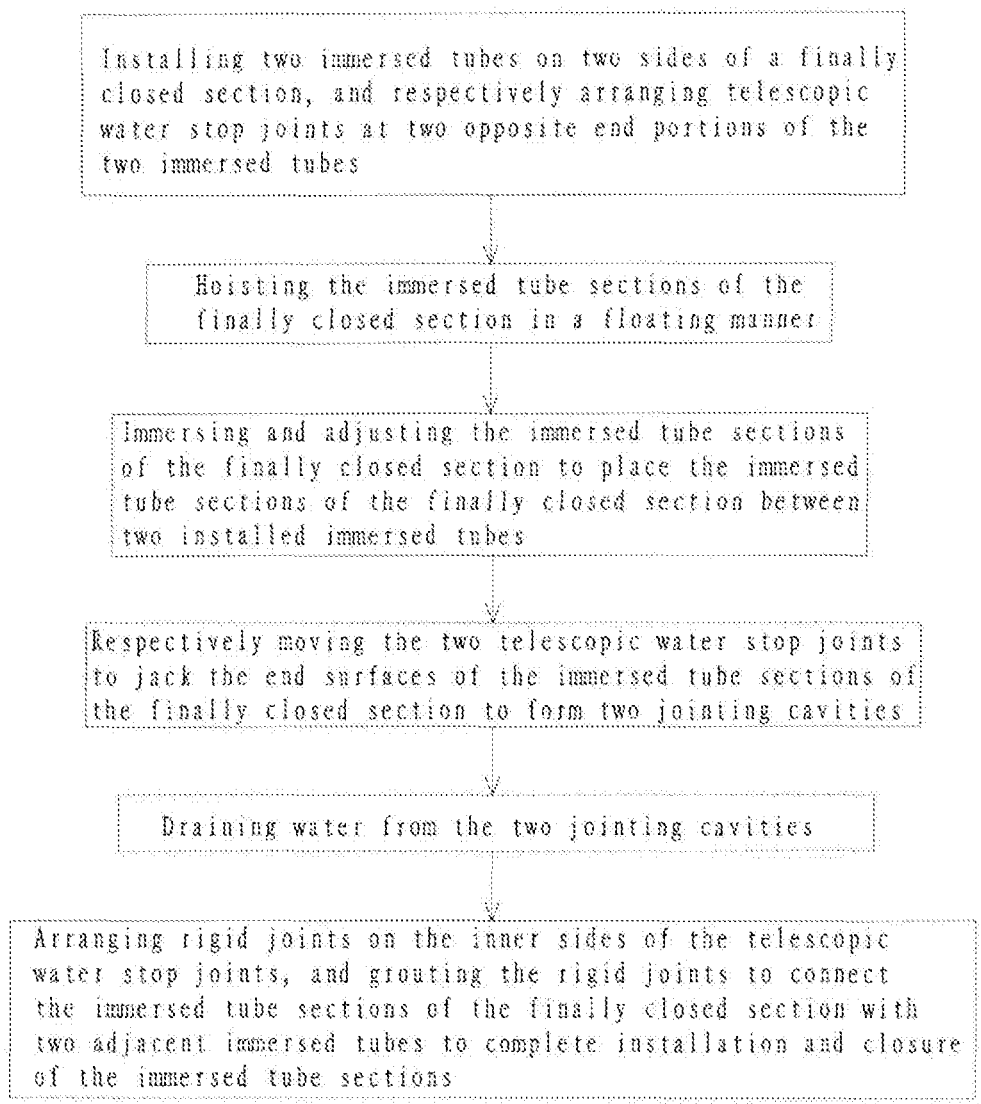
FIG. 20 is a flow diagram of an installation and closure method of immersed tube sections of the present application.

End seal doors 5 are arranged at two ends of each immersed tube section to prevent seawater from entering the immersed tube section. After the immersed tube section is jointed with an installed immersed tube section, a jointing cavity 8 is formed between two oppositely arranged end seal doors 5 of two adjacent immersed tube sections, wherein as shown in FIGS. 1 to 3, other common immersed tube sections at non-finally closed positions are connected for running through with immersing and jointing joints 9; after water in the jointing cavity 8 is drained off, the end seal doors 5 are removed so as to communicate the two adjacent immersed tube sections; and here, the immersed tube sections include the pre-laid and installed standard immersed tube section 1 and the finally closed integrated immersed tube section.

As a preferable scheme of this embodiment, the standard immersed tube section 1 is of a sandwich steel shell integrated structure; the end portions of the two ends of the standard immersed tube section 1 are of steel cap structures; and the cross section of the standard immersed tube section 1 adopts two holes and one pipe gallery.

As a preferable scheme of this embodiment, the telescopic water stop joints 2 include closed annular frame beams 21, power components 22, first closed annular water stop components 3 and second closed annular water stop components 4; one end of each power component 22 is connected to each end portion of the standard immersed tube section 1, and the other end of the power component 22 is connected to each frame beam 21 and may drive the frame beam 21 to extend and retract along the axial direction of the standard immersed tube section 1; the first water stop components 3 are connected to the end portions of the frame beams 21; and one end of each second water stop component 4 is connected to each frame beam 21, and the other end of the second water stop component 4 is connected to each end portion of the standard immersed tube section 1.

After the integrated immersed tube section is mounted in place, the power components 22 arranged at the two ends of the integrated immersed tube section jack and push the corresponding frame beams 21 to move; each frame beam 21 moves to drive each corresponding first water stop component 3 to be closely fitted to the end surface of each corresponding immersed tube section, so that the integrated immersed tube section is jointed with the two adjacent immersed tube sections to isolate seawater inside and outside the tube sections to complete water stopping; the second water stop components 4 are of extensible flexible structures, and may extend along with movements of the corresponding frame beams 21; and the second water stop components 4 prevent the seawater from entering the integrated immersed tube section from gaps between the frame beams 21 and the end portions of the standard immersed tube section 1.

The power components 22 include a plurality of hydraulic jacks; all the hydraulic jacks are uniformly distributed at the end portions of the standard immersed tube section 1. The first water stop components 3 are Gina water stop bands. The second water stop components 4 are M water stop bands. Annular grooves 11 are formed in the end portions of the standard immersed tube section 1; the frame beams 21 are matched with the grooves 11; and the telescopic water stop joints 2 may slide in the grooves 11. The power components 22 are arranged in the grooves 11.

As a preferable scheme of this embodiment, included angles between the top surface of the standard immersed tube section 1 and the end surfaces of the standard immersed tube section 1 are equal, and are all 84 degrees. A plurality of anti-collision blocks are arranged on two end surfaces of the standard immersed tube section 1 to prevent a structural damage or a function failure of the telescopic water stop joints 2 due to a displacement or a structural damage of the integrated immersed tube section and/or two immersed tube sections, which is caused by collision between the standard immersed tube section 1 and the two immersed tube sections during matching between the integrated immersed tube section and the two immersed tube sections.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 2

As shown in FIG. 2, an integrated immersed tube section of the present application includes a standard immersed tube section 1, and closed annular telescopic water stop joints 2 are arranged at two ends of the standard immersed tube section 1.

What is different from Embodiment 1 is that two flexible joints 7 are arranged on the standard immersed tube section 1 included in the integrated immersed tube section; each flexible joint 7 enables the standard immersed tube section 1 to keep rigidity and also have flexibility, thus facilitating releasing of internal stress of the standard immersed tube section 1 after a closure.

As a preferable scheme of this embodiment, two flexible joints 7 are arranged at positions, which are close to the two ends, on the standard immersed tube section 1, and divide the standard immersed tube section 1 into three tube section segments. Each flexible joint 7 includes a circle of closed annular first water stop band; and the first water stop bands are pre-compressed by prestress components, and are closely fitted to the end surfaces of two adjacent tube section segments. The first water stop bands are Gina water stop bands. Each flexible joint 7 also includes a plurality of jacking components; the length of each jacking component is adjustable; the jacking components are arranged on the annular inner sides of the first water stop bands in a spacing manner; each jacking component jacks two tube section segments along its adjustment direction; and all the jacking components are used to prevent further pressing damage to the first water stop bands under the action of water pressure. Each flexible joint 7 further includes a circle of closed annular second water stop band which is located on the annular inner side of each first water stop band, and is used for secondary waterproofing. The second water stop bands are $\Omega$ water stop bands; one hem of each $\Omega$ water stop band is connected to the end portion of one tube section segment, and the other hem of the $\Omega$ water stop band is connected to the end portion of the adjacent tube section segment; and the $\Omega$ water stop bands protrude towards the inside of the standard immersed tube section 1.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 3

As shown in FIG. 3, an integrated immersed tube section of the present application includes a standard immersed tube section 1, and closed annular telescopic water stop joints 2 are arranged at two ends of the standard immersed tube section 1.

What is different from Embodiment 1 is that a flexible joint 7 is arranged on each of standard immersed tube sections 1, which are arranged on two sides of the integrated immersed tube section and are closed with the integrated immersed tube section; each flexible joint 7 enables the standard immersed tube sections 1 to keep rigidity and also have flexibility, thus facilitating releasing of internal stress of the standard immersed tube sections 1 and the integrated immersed tube section after the closure.

As a preferable scheme of this embodiment, each flexible joint 7 divides each corresponding standard immersed tube section 1 into two tube section segments. Each flexible joint 7 includes a circle of closed annular first water stop band; and the first water stop bands are pre-compressed by prestress components, and are closely fitted to the end surfaces of two adjacent tube section segments. The first water stop bands are Gina water stop bands. Each flexible joint 7 also includes a plurality of jacking components; the length of each jacking component is adjustable; all the jacking components are arranged on the annular inner sides of the first water stop bands in a spacing manner; each jacking component jacks the two tube section segments along its adjustment direction; and all the jacking components are used to prevent further pressing damage to the first water stop bands under the action of water pressure. Each flexible joint 7 further includes a circle of closed annular second water stop band which is located on the annular inner side of each first water stop band, and is used for secondary waterproofing. The second water stop bands are $\Omega$ water stop bands; one hem of each $\Omega$ water stop band is connected to the end portion of one tube section segment, and the other hem of the $\Omega$ water stop band is connected to the end portion of the adjacent tube section segment; and the $\Omega$ water stop bands protrude towards the insides of the standard immersed tube sections 1.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 4

As shown in FIG. 1 and FIGS. 7 to 9, an integrated immersed tube section of the present application includes a standard immersed tube section 1, and closed annular telescopic water stop joints 2 are arranged at two ends of the standard immersed tube section 1.

What is different from Embodiment 1 is that the telescopic water stop joints 2 further include counter force components 23; frame beams 21 are connected with the counter force components 23; the counter force components 23 are connected with the power components 22; and the power components 22 are connected to the end portions of the standard immersed tube section 1. The counter force components 23 include a plurality of counter force frames. Each counter force frame is correspondingly connected with one hydraulic jack.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 5

As shown in FIG. 1 and FIGS. 10 to 12, an integrated immersed tube section of the present application includes a standard immersed tube section 1, and closed annular telescopic water stop joints 2 are arranged at two ends of the standard immersed tube section 1.

What is different from Embodiment 4 is that the inner sides of annular cavities of frame beams 21 are connected with supporting components 6. By adoption of such structural arrangement, the supporting components 6 enable the frame beams 21 to keep certain rigidity and move steadily; in addition, during subsequent water drainage from jointing cavities 8, an internal pressure of the frame beams 21 is less than an external pressure of the frame beams 21; the supporting components 6 effectively support the frame beams 21 to prevent the frame beams 21 from losing part of original functions due to their deformations caused by an environmental pressure change, thus achieving aims of design and use. The supporting components 6 include a plurality of transverse supporting steel pipes and a plurality of longitudinal supporting steel pipes; all the transverse supporting steel pipes and all the longitudinal supporting steel pipes are arranged in a staggering manner; and each transverse supporting steel pipe and each longitudinal supporting steel pipe are rigidly connected.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 6

As shown in FIG. 1 and FIGS. 13 to 15, an integrated immersed tube section of the present application includes a standard immersed tube section 1, and closed annular telescopic water stop joints 2 are arranged at two ends of the standard immersed tube section 1.

What is different from Embodiment 1 is that frame beams 21 are connected with counter force components 23; the counter force components 23 are connected with power components 22; and the power components 22 are connected to end seal doors 5.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 7

As shown in FIG. 1 and FIGS. 16 to 18, an integrated immersed tube section of the present application includes a standard immersed tube section 1, and closed annular telescopic water stop joints 2 are arranged at two ends of the standard immersed tube section 1.

What is different from Embodiment 6 is that the inner sides of annular cavities of frame beams 21 are connected with supporting components 6. By adoption of such structural arrangement, the supporting components 6 enable the frame beams 21 to keep certain rigidity and move steadily; in addition, during subsequent water drainage from jointing cavities 8, an internal pressure of the frame beams 21 is less than an external pressure of the frame beams 21; the supporting components 6 effectively support the frame beams 21 to prevent the frame beams 21 from losing part of original functions due to their deformations caused by an environmental pressure change, thus achieving aims of design and use. The supporting components 6 include a plurality of transverse supporting steel pipes and a plurality of longitudinal supporting steel pipes; all the transverse supporting steel pipes and all the longitudinal supporting steel pipes are arranged in a staggering manner; and each transverse supporting steel pipe and each longitudinal supporting steel pipe are rigidly connected.

By the adoption of the integrated immersed tube section of the present application, the finally closed immersed tube section is still the standard immersed tube section 1, and a foundation which is the same as that for the common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with an existing method, the method has the advantages of eliminating installation of one special final joint, simplifying the construction process and reducing the engineering risk. As the offshore special construction equipment and ships are very expensive in rent, use of the integrated immersed tube section substantially reduces the cost and saves various resources.

Embodiment 8

As shown in FIGS. 1 to 19, an installation method of an integrated immersed tube section of the present application includes:

A. hoisting the integrated immersed tube section to an immersion position in a floating manner, wherein the integrated immersed tube section includes a standard immersed tube section 1, and closed annular telescopic water stop joints 2 are arranged at two ends of the standard immersed tube section 1;

B. immersing the integrated immersed tube section, and adjusting the position of the integrated immersed tube section to place the integrated immersed tube section between two installed immersed tube sections;

C. respectively moving the two telescopic water stop joints 2 to jack the end surfaces of the corresponding immersed tube sections to form two jointing cavities 8 for isolating seawater inside and outside the tube sections, thus completing water stopping;

D. performing pressure adjustment for water drainage: draining water which is ⅕ to ½ of the total water amount in the jointing cavities 8 under a differential pressure so as to enable pressure values in the jointing cavities 8 to be gradually reduced to the atmospheric pressure, and enable the jointing cavities to be opened to the atmosphere;

E. performing water drainage with a ballast pump: pumping out residual water in the jointing cavities 8 with the ballast pump;

F. arranging a rigid joint on the inner side of each telescopic water stop joint 2 to connect the integrated immersed tube section with two adjacent immersed tube sections, and grouting the rigid joints to complete installation of the integrated immersed tube section.

End seal doors 5 are arranged at two ends of each immersed tube section to prevent seawater from entering the immersed tube section. After the immersed tube section is jointed with an installed immersed tube section, a jointing cavity 8 is formed between two oppositely arranged end seal doors 5 of the two adjacent immersed tube sections; after water in the jointing cavity 8 is drained off, the end seal doors 5 are removed so as to communicate the two adjacent immersed tube sections; and here, the immersed tube sections include the pre-laid and installed standard immersed tube sections and the finally closed integrated immersed tube section.

As a preferred scheme of this embodiment, before the step A, a foundation bed for the integrated immersed tube section is laid on the seabed, and is consistent with foundation beds for other immersed tube sections. During implementation of the step A, the position of the integrated immersed tube section on a horizontal plane is adjusted once when the integrated immersed tube section settles 10 m at each time so as to match positions between the integrated immersed tube section and the two immersed tube sections. After the step C, a diver confirms that no included foreign matters exist between each telescopic water stop joint 2 and the end portion of each corresponding immersed tube section, and then the step D is carried out. During implementation of the step D, pressures in the jointing cavities 8 are adjusted when the water is drained, so that the pressures in the jointing cavities 8 can be steadily reduced from a seabed water pressure to the atmospheric pressure. After the step E is completed, it confirms that the watertightness conditions of the jointing cavities 8 meet the design requirements, and the residual water in the jointing cavities 8 is drained off with a stripping pump. Air compressors are arranged in the immersed tube sections, and are used to input air into the jointing cavities 8 in the step D so as to adjust the pressure. First pressure gauges are arranged on the end seal doors 5, and are used to monitor real-time pressures in the jointing cavities 8. Second pressure gauges are arranged on the air compressors, and before the step D, initial pressures of both the first pressure gauges and the second pressure gauges are calibrated. After the step F is completed, exposed portions of the two adjacent immersed tube sections and the integrated immersed tube section are backfilled. The backfilling includes covering backfilling and ballast backfilling. The exposed portions of the two adjacent immersed tube sections and the integrated immersed tube section are firstly subjected to the covering backfilling, and are then subjected to the ballast backfilling. After the step E, the integrated immersed tube section and the end seal doors 5 in the two immersed tube sections closed with the integrated immersed tube section are removed.

By the adoption of the installation method of the integrated immersed tube section of the present application, the finally closed immersed tube section is still the standard immersed tube section 1, and a foundation which is the same as that for common tube sections is used, namely there is no rigidity difference between the foundation for the finally closed immersed tube section and the foundation for other immersed tube sections, so that the risk of the non-uniform settlement of the tube sections during operation of the subsea tunnel is effectively reduced; and in addition, the finally closed immersed tube section and other immersed tube sections are installed with the same installation equipment, and no extra equipment such as a floating crane is needed. Compared with the existing method, the installation method has the advantages of eliminating installation of one special final joint, simplifying the construction process and reducing the engineering risk. As the offshore special construction equipment and ships are very expensive in rent, use of the installation method of the integrated immersed tube section substantially reduces the cost and saves various resources. The method has a clear theory and simple steps, and may accurately and successfully install the integrated immersed tube section between two immersed tube sections, thus realizing successful jointing and opening of the integrated immersed tube section and the two immersed tube sections.

Embodiment 9

As shown in FIGS. 1 to 3 and FIG. 20, an installation and closure method of immersed tube sections of the present application includes:

a. installing two standard immersed tube sections 1 on two sides of a finally closed section, and respectively arranging closed annular telescopic water stop joints 2 at two opposite end portions of the two standard immersed tube sections 1;

b. hoisting the standard immersed tube sections 1 of the finally closed section to immersion positions in a floating manner;

c. immersing and adjusting the standard immersed tube sections 1 of the finally closed section to place the standard immersed tube sections 1 of the finally closed section between two installed standard immersed tube sections 1;

d. respectively moving the two telescopic water stop joints 2 located on two sides of each standard immersed tube section 1 of the finally closed section to jack the two end surfaces of each standard immersed tube section 1 of the finally closed section to form two jointing cavities 8 for isolating seawater inside and outside the tube sections, thus completing water stopping;

e. draining water from the two jointing cavities 8;

f. arranging a rigid joint on the inner side of each telescopic water stop joint 2 to connect the standard immersed tube sections 1 of the finally closed section with two adjacent standard immersed tube sections 1, and grouting the rigid joints to complete installation and closure of the immersed tube sections.

By the adoption of the installation and closure method of the immersed tube sections of the present application, the finally closed immersed tube sections are still the standard immersed tube sections 1, and a foundation which is the same as that for common tube sections is used, namely there is no rigidity difference between the foundation for the finally closed immersed tube sections and the foundation for other immersed tube sections, so that the risk of the non-uniform settlement of the tube sections during operation of the subsea tunnel is effectively reduced; and in addition, the finally closed immersed tube sections and other immersed tube sections are installed with the same installation equipment, and no extra equipment such as a floating crane is needed. Compared with the existing method, the installation and closure method has the advantages of eliminating installation of one special final joint, simplifying the construction process and reducing the engineering risk. As the offshore special construction equipment and ships are very expensive in rent, use of the installation and closure method of the immersed tube sections substantially reduces the cost and saves various resources. The method has a clear theory and simple steps, and may accurately and successfully install the standard immersed tube section 1 between two standard immersed tube sections 1, thus realizing successful jointing and opening of the subsea tunnel.

The above mentioned embodiments are only preferred embodiments of the present application, but not intended to limit the present application. Any modifications, equivalent replacements, improvements and the like which are made within the spirit and the principle of the present application shall all fall within the protection scope of the present application.

The invention claimed is:

1. An integrated immersed tube section, comprising a standard immersed tube section and closed annular telescopic water stop joints at ends of the standard immersed tube section, wherein each of the telescopic water stop joints comprises a closed annular frame beam, power components, first closed annular water stop components and second closed annular water stop components; one end of each power component is connected to an end portion of the standard immersed tube section, and another end of each power component is connected directly or indirectly to the frame beam and may drive the frame beam to extend and retract along an axial direction of the standard immersed tube section; the first water stop components are connected to the frame beam; and one end of each second water stop component is connected to the frame beam, and another end of the second water stop component is connected to the end portion of the standard immersed tube section.

2. The integrated immersed tube section according to claim 1, further comprising annular grooves in end portions of the standard immersed tube section; the frame beams are matched with the annular grooves; and the telescopic water stop joints slide in the grooves.

3. The integrated immersed tube section according to claim 2, wherein the power components are in the annular grooves.

4. The integrated immersed tube section according to claim 2, wherein the telescopic water stop joints further comprise counter force components; the frame beam is connected with the counter force components; and the counter force components are connected with the power components.

5. The integrated immersed tube section according to claim 4, wherein the counter force components comprise a plurality of counter force frames.

6. The integrated immersed tube section according to claim 4, further comprising end seal doors at the ends of the standard immersed tube section; wherein the power components are connected to the end seal doors.

7. The integrated immersed tube section according to claim 1, wherein the power components comprise a plurality of hydraulic jacks.

8. The integrated immersed tube section according to claim 7, wherein the hydraulic jacks are uniformly distributed at the end portion of the standard immersed tube section.

9. The integrated immersed tube section according to claim 1, wherein the frame beam has an annular cavity with inner sides connected with supporting components.

10. The integrated immersed tube section according to claim 9, wherein the supporting components comprise a plurality of transverse supporting steel pipes and a plurality of longitudinal supporting steel pipes; the transverse supporting steel pipes and the longitudinal supporting steel pipes are staggered; and each transverse supporting steel pipe and each longitudinal supporting steel pipe are rigidly connected.

11. The integrated immersed tube section according to claim 1, wherein the standard immersed tube section comprises at least one flexible joint that enables the standard immersed tube section to keep rigidity and also have flexibility.

12. The integrated immersed tube section according to claim 11, wherein the at least one flexible joint comprises two flexible joints at positions close to two ends of the standard immersed tube section, and the two flexible joints divide the standard immersed tube section into three tube section segments.

13. The integrated immersed tube section according to claim 1, wherein an included angle between a top surface of the standard immersed tube section and each end surface of the standard immersed tube section is 60 to 90 degrees.

14. The integrated immersed tube section according to claim 13, wherein the included angle between the top surface of the standard immersed tube section and each end surface of the standard immersed tube section is identical.

15. The integrated immersed tube section according to claim 1, further comprising a plurality of anti-collision blocks on end surfaces of the standard immersed tube section.

16. An installation method of an integrated immersed tube section, comprising:
  hoisting the integrated immersed tube section to an immersion position in a floating manner, wherein the integrated immersed tube section comprises a standard immersed tube section and closed annular telescopic water stop joints at ends of the standard immersed tube section, wherein each of the telescopic water stop joints comprises a closed annular frame beam, power components, first closed annular water stop components and second closed annular water stop components; one end of each power component is connected to an end portion of the standard immersed tube section, and another end of each power component is connected directly or indirectly to the frame beam and may drive the frame beam to extend and retract along an axial direction of the standard immersed tube section; the first water stop components are connected to the frame beam; and one end of each second water stop component is connected to the frame beam, and another end of the second water stop component is connected to the end portion of the standard immersed tube section;
  immersing the integrated immersed tube section and adjusting a position of the integrated immersed tube section to place the integrated immersed tube section between two installed immersed tube sections;
  respectively moving the telescopic water stop joints to jack end surfaces of corresponding immersed tube sections to form jointing cavities for isolating seawater inside and outside the corresponding immersed tube sections, thus completing water stopping;
  draining water from the jointing cavities;
  arranging a rigid joint on an inner side of each telescopic water stop joint to connect the integrated immersed tube section with the installed immersed tube sections, and grouting the rigid joints to complete installation of the integrated immersed tube section.

17. The installation method of the integrated immersed tube section according to claim 16, further comprising, before hoisting the integrated immersed tube section to the immersion position, laying a foundation bed for the integrated immersed tube section on the seabed, consistent with foundation beds for the installed immersed tube sections.

18. The installation method of the integrated immersed tube section according to claim 16, wherein during hoisting the integrated immersed tube section to the immersion position, the method further comprises adjusting the position of the integrated immersed tube section on a horizontal plane when the integrated immersed tube section settles 8 to 12 m at each time so as to match positions between the integrated immersed tube section and the two installed immersed tube sections.

19. The installation method of the integrated immersed tube section according to claim 16, further comprising, after respectively moving the telescopic water stop joints, confirming that no included foreign matter exists between each telescopic water stop joint and an end portion of each corresponding immersed tube section, and then draining the water from the jointing cavities.

20. The installation method of the integrated immersed tube section according to claim 16, wherein during draining the water from the jointing cavities, the method further comprises adjusting pressures in the jointing cavities so that the pressures in the jointing cavities can be steadily reduced from a seabed water pressure to atmospheric pressure.

21. The installation method of the integrated immersed tube section according to claim 16, further comprising, after arranging the rigid joint on the inner side of each telescopic water stop joint, backfilling exposed portions of the installed immersed tube sections and the integrated immersed tube section.

22. The installation method of the integrated immersed tube section according to claim 16, wherein the integrated immersed tube section further comprises end seal doors at ends thereof to prevent seawater from entering the integrated immersed tube section, and the method further comprises, after draining the water from the jointing cavities, removing the end seal doors to close or communicate the installed immersed tube sections with the integrated immersed tube section.

23. An installation and closure method of immersed tube sections, comprising:
  installing standard immersed tube sections on sides of a finally closed section, and respectively arranging closed annular telescopic water stop joints at opposite end portions of the standard immersed tube sections, wherein each of the telescopic water stop joints comprises a closed annular frame beam, power components, first closed annular water stop components and second closed annular water stop components; one end of each power component is connected to an end portion of the standard immersed tube section, and another end of each power component is connected directly or indirectly to the frame beam and may drive the frame beam to extend and retract along an axial direction of the standard immersed tube section; the first water stop components are connected to the frame beam; and one end of each second water stop component is connected to the frame beam, and another end of the second water stop component is connected to the end portion of the standard immersed tube section;
  hoisting the standard immersed tube sections of the finally closed section to immersion positions in a floating manner;
  immersing and adjusting the standard immersed tube sections of the finally closed section to place the standard immersed tube sections of the finally closed section between two installed standard immersed tube sections;
  respectively moving the telescopic water stop joints at the ends of the standard immersed tube sections of the finally closed section to jack the end surfaces of the standard immersed tube sections of the finally closed section and form jointing cavities for isolating seawater inside and outside the tube sections, thus completing water stopping;
  draining water from the jointing cavities;
  arranging a rigid joint on an inner side of each telescopic water stop joint to connect the standard immersed tube sections of the finally closed section with adjacent standard immersed tube sections, and grouting the rigid joints to complete installation and closure of the immersed tube sections.

24. An integrated immersed tube section, comprising a standard immersed tube section and closed annular telescopic water stop joints at ends of the standard immersed tube section, wherein the standard immersed tube section comprises at least one flexible joint that enables the standard immersed tube section to keep rigidity and also have flexibility, and the at least one flexible joint comprises two flexible joints at positions close to two ends of the standard immersed tube section, and the two flexible joints divide the standard immersed tube section into three tube section segments.

25. The integrated immersed tube section according to claim 24, wherein each flexible joint comprises a closed annular first water stop band; and the first water stop band is pre-compressed by prestress components and fits closely to end surfaces of two adjacent tube section segments.

26. The integrated immersed tube section according to claim 25, wherein each flexible joint also comprises a plurality of jacking components; each jacking component has an adjustable length; the jacking components are on inner sides of the first water stop bands in a spacing manner; and each jacking component jacks two tube section segments along an adjustment direction of the jacking component.

27. The integrated immersed tube section according to claim 25, wherein each flexible joint further comprises a closed annular second water stop band on an inner side of each first water stop band.

* * * * *